(12) United States Patent
Juenger et al.

(10) Patent No.: US 12,070,687 B2
(45) Date of Patent: Aug. 27, 2024

(54) MOBILE GAME TRAINER USING CONSOLE CONTROLLER

(71) Applicant: Sony Interactive Entertainment Inc., Tokyo (JP)

(72) Inventors: Elizabeth Ruth Juenger, San Francisco, CA (US); Ryan Sutton, Venice, CA (US); Gary Grossi, San Francisco, CA (US); Jason Grimm, Sunnyvale, CA (US); Mingtao Wu, San Francisco, CA (US); Yuji Tsuchikawa, Culver City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/890,141

(22) Filed: Aug. 17, 2022

(65) Prior Publication Data
US 2024/0058700 A1   Feb. 22, 2024

(51) Int. Cl.
*A63F 13/497* (2014.01)
*A63F 13/533* (2014.01)
*A63F 13/5375* (2014.01)
*A63F 13/69* (2014.01)
*A63F 13/92* (2014.01)

(52) U.S. Cl.
CPC ........ *A63F 13/5375* (2014.09); *A63F 13/497* (2014.09); *A63F 13/533* (2014.09); *A63F 13/69* (2014.09); *A63F 13/92* (2014.09)

(58) Field of Classification Search
None
See application file for complete search history.

(56) References Cited

U.S. PATENT DOCUMENTS

| | | | |
|---|---|---|---|
| 6,699,127 B1 * | 3/2004 | Lobb ...................... | A63F 13/45 463/43 |
| 2010/0113116 A1 | 5/2010 | Theis | |
| 2012/0276992 A1 * | 11/2012 | Moinuddin ........... | A63F 13/798 463/31 |
| 2013/0130807 A1 | 5/2013 | Youm et al. | |
| 2017/0144074 A1 | 5/2017 | Brunstetter et al. | |
| 2018/0001205 A1 * | 1/2018 | Osman ................... | A63F 13/67 |
| 2018/0229127 A1 | 8/2018 | Nahari et al. | |
| 2020/0222802 A1 | 7/2020 | Sherwani et al. | |
| 2021/0106918 A1 | 4/2021 | Osman et al. | |
| 2021/0236944 A1 | 8/2021 | Summa et al. | |

OTHER PUBLICATIONS

International Search Report and Written Opinion for International Application No. PCT/US2023/026261, dated Oct. 5, 2023.

* cited by examiner

*Primary Examiner* — Damon J Pierce
(74) *Attorney, Agent, or Firm* — JDI PATENT; Joshua D. Isenberg; Robert Pullman (57) ABSTRACT

A system and method provide application assistance with a mobile device including running an application on a computer system. A challenging application state of the application is detected. An assistance for the challenging application state may be determined wherein the assistance includes display of one or more assistance frames on the mobile device. Information regarding the determined one or more assistance frames is sent to the mobile device.

26 Claims, 8 Drawing Sheets

MOBILE GAME TRAINER USING CONSOLE CONTROLLER

FIELD OF THE DISCLOSURE

Aspects of the present disclosure relate to training assistance in applications, specifically aspects of the present disclosure relate to the use of a mobile device providing training assistance for a videogame running on a second device.

BACKGROUND OF THE DISCLOSURE

Videogames often require skill and practice to succeed. Many videogames also include competitive modes that place users against other users. Additionally, videogames are often graphically and processing power intensive and therefore they are tied to computer systems that have the requisite graphics and processing power to run the videogame. These computer systems are often immobile and located at the user's home. Thus, a player wanting to practice and hone their skills at a videogame must be at home. While there are handheld videogame consoles, they are often underpowered and may run inferior versions of the same games from the computer system. Additionally, a user may not want to play through an entire game on their handheld console to practice and the skills may not be applicable between the handheld console and the computer system.

Mobile devices, such as cell phones and media players have become common items that most people carry with them every day. While applications have been developed that allow some combination of use with computer systems there has not been an application that fully integrates aspects of the mobile device with the larger computer system.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

According to aspects of the present disclosure a mobile device may be used with an application running on a computer system to create a trainer for users of the application. The mobile device running the training application (also referred to herein as the mobile game trainer) may be used while the application (such as a video game) is running on the computer system. The mobile game trainer may supply users of the application with additional information to enhance the user's experience with the application. For example and without limitation, the mobile application may display key presses or key combinations or controller button presses or controller button press combinations for the user while the application is running on the computer system, the mobile game trainer may provide synchronized help information to the user such as weak point locations or item locations in a video game application.

Implementations

Figure 1:
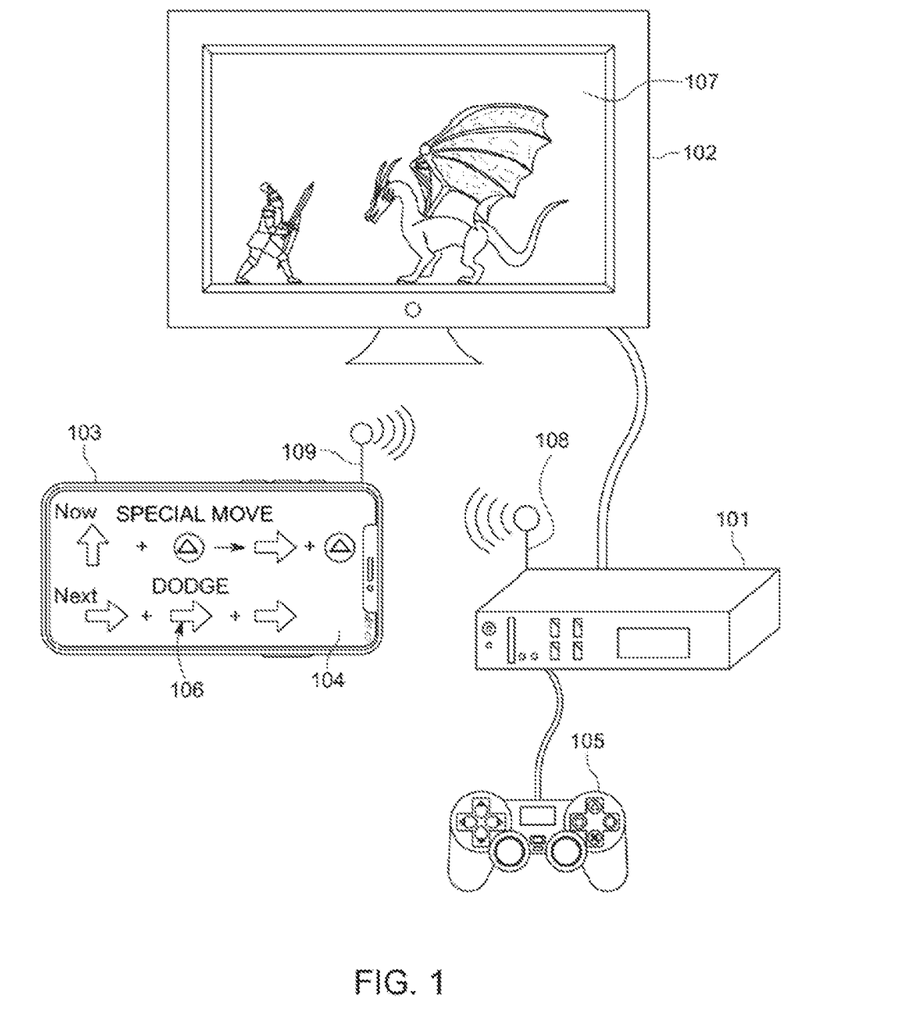
FIG. 1 is a diagram depicting an example of an implementation of a mobile game trainer wirelessly coupled with a computer system running an application according to an aspect of the present disclosure.

FIG. 1 diagrammatically depicts an implementation of a mobile game trainer wirelessly coupled with a computer system running an application according to an aspect of the present disclosure. As shown, a mobile device 103 run an assistance application 106 to provide assistance to a user running an application on a computer system 101. The computer system may be coupled to a display screen 102 which may display frames from the application 107. Additionally, as depicted, the computer system 101 may include a wireless connection 108 (e.g., a transceiver and antenna) and may be communicatively coupled to the mobile device 103 which also may include a similarly-configured wireless connection 109. For example and without limitation, the computer system may be communicatively coupled to the mobile device via wireless connection such as Wireless Personal Area Networking (WPAN), wireless local networking (WLAN), Wireless Wide Area Networking (WWAN), wireless cellular network, etc. As used herein, the term "communicatively coupled" means that at least one of the coupled devices is able to pass to another signals containing information that the other can interpret. Such information may include, but is not limited to, commands, data, text, images, graphics, video or audio. The signals may pass through any number of intermediary devices and the format of the signals may change but the content remains the same.

The application 107 may be controlled by a game controller 105. The trainer application on the mobile device 103 may present assistance frames 106 with the mobile device's display 104. Additionally, the mobile device may be communicatively coupled to a controller 105 through the computer system 101 via a wired or wireless connection. The controller 105 may be used to input control signals, e.g., button presses, joystick positions, and the like, into the assistance application. By way of example and without limitation the mobile trainer may implement a button training wherein the user may be prompted to input certain button presses or button combinations corresponding to special or secret button presses or button press combinations for the application.

The application running on the computer system 101 may be for example and without limitation a video game, video editing program, word processor, spreadsheet, or other interactive application. In the implementation shown, the application is a video game. The computer system may be for example and without limitation, a personal computer (PC), game console, or server. The mobile device 103 may be for example and without limitation a mobile phone, tablet computer, e-reader, mobile game console or other device including an integrated screen. In the video game application example shown a character is fighting a dragon. One or more assistance frames 106 displayed on the mobile display 104 may include for example and without limitation text, graphics, video, animation, or audio that identifies, e.g., button presses or button press combination, key press or key press combination, highlighted or outlined areas of frames from the application, video, an image frame, animated graphics interchange format (GIF) or similar file, a replay of frames from the application, or a slowed down replay of frames from the application.

In the example shown in FIG. 1, the one or more assistance frames include special move button presses for the application. These assistance frames may be synchronized with states of the application to provide assistance at challenging states of the application. For example and without limitation, as shown, the assistance frames are displaying a dodge button press combination in synchronization with the game on the display screen for the user to dodge attacks made by the dragon.

Figure 2:
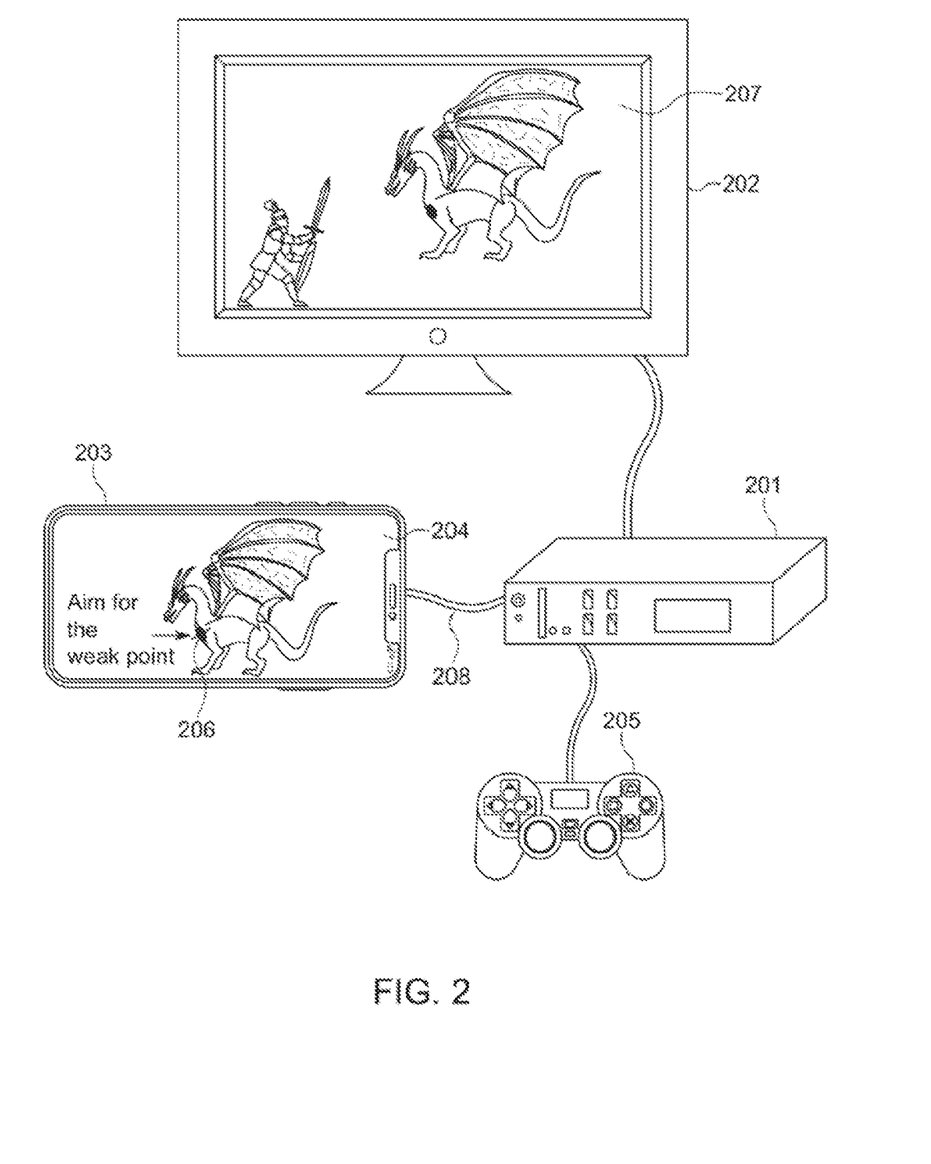
FIG. 2 is a diagram showing an example of an implementation of a mobile game trainer coupled with a computer system running an application according to an aspect of the present disclosure.

FIG. 2 is a diagram showing an implementation of a mobile game trainer coupled with a computer system running an application according to an aspect of the present disclosure. In the implementation shown, the mobile device 203 running the mobile trainer is communicatively coupled to the computer system 201 via a wired connection 208. The wired connection may be, by way of example and not by way of limitation, a universal serial bus (USB), ethernet, serial interface, high-definition multimedia interface, or similar connection type. Here, the one or more assistance frames 206 presented with the mobile display 204 of the mobile device 203 include, for example and without limitation, a frame 207 from an application running on the computer system 201 with one or more areas of the frame highlighted or outlined. The one or more assistance frames may be synchronized with the application to display the one or more assistance frames 206 concurrently with frames 207 of the application displayed on the display screen 202. This may allow users to look at their mobile device for assistance with the application while using the application and leave the display screen 202 free from clutter. Additionally, the one or more assistance frames may be saved to the mobile device allowing the user to review assistance frames (e.g. the different outlined or highlighted areas) when they are away from the computer system. Here, the application frame 207 is from a game having a character fighting a dragon with a spear. The user controls the character using a controller 205 coupled to the computer system 201. The one or more assistance frames 206 displayed on the mobile device show a frame including the dragon with a weak point of the dragon highlighted or outlined, additionally text is displayed over the frame pointing to the highlighted area and describing the importance of the area.

For example and without limitation, to display the highlighted area of the frame the computer system may determine that one or more states of the application are challenging application states. The computer system may further choose an assistance output based on the determination of the challenging application state. For example with regards to the implementation shown in FIG. 2 the application may include assets that are highlighted or outlined. The computer system 201 may use these assets to create one or more assistance frames displaying the highlighted or outlined area within the frame. Alternatively, the system may search for key words or phrases and determine from key words or phrases the location of areas of the frame that correspond to the key words or phrases and highlight or outline those areas. For example and without limitation, a game developer may include a key word or flag in the application code that corresponds to a weak point of a monster within a game, the computer system may apply a color effect or outline in the areas of the one or more frames determined to be showing areas corresponding to the key word or flag. In yet another alternative implementation the assets may include one or more static frames showing areas of the frames highlighted or outlined created by the application developers and stored in memory to be sent to the mobile device. Additionally in some implementations text and graphical elements, e.g., arrows, may also be generated on the screen, the text may be generated from phrases or words stored in memory as assistance information the text may be added to frames according to one or more developer flags or key words, similarly simple images such as arrows may be added to frames using flags or key words. For example and without limitation if a particular area of a frame is flagged as a weak point, the text "weak point" and an arrow with the head pointing to the weak point may be added to the assistance frame and displayed with one or more the assistance frames on the mobile display.

Figure 3:
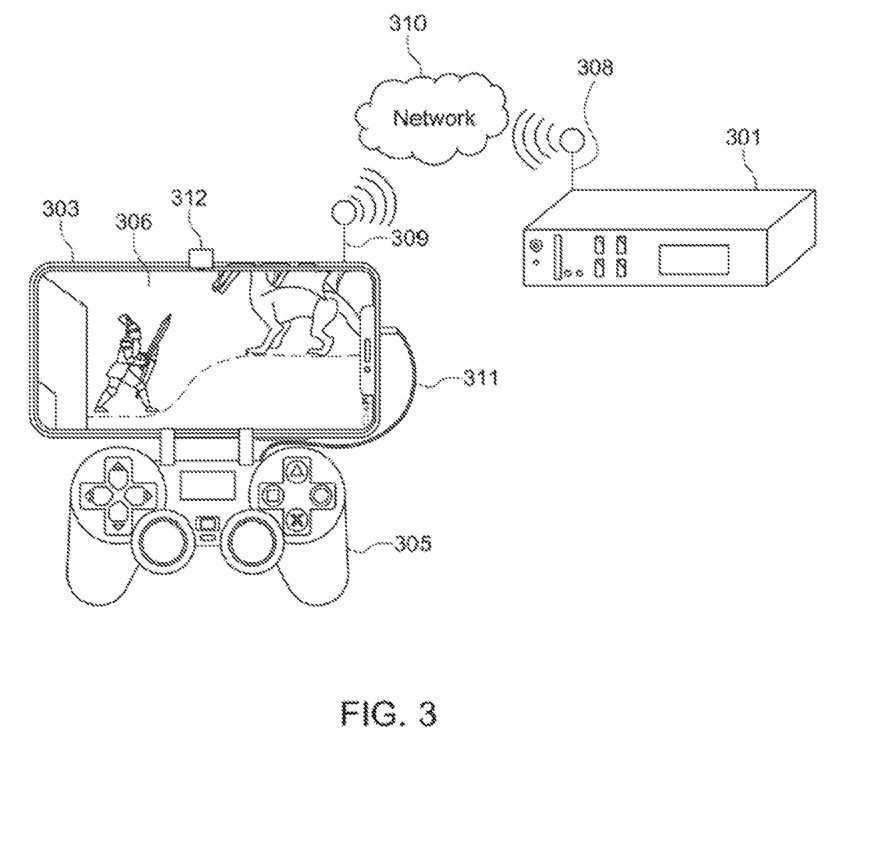
FIG. 3 is a diagram showing an example of an implementation of a mobile game trainer on a mobile device coupled to a game controller and computer system according to aspects of the present disclosure.

FIG. 3 depicts an implementation of a mobile game trainer on a mobile device coupled to a game controller and computer system according to aspects of the present disclosure. As shown, a mobile device 303 may run the game trainer application and present one or more assistance frames 306. The mobile device may also be coupled with a full sized game controller 305 which may be used to control the mobile trainer application and the one or more assistance frames 306. The one or more assistance frames 306 may be received from a computer system 301 communicatively coupled to the mobile device 303. For example and without limitation, the console may be wirelessly or physically coupled to the device. In the implementation shown, the computer system 301 includes a wireless connection 308 (e.g., an antenna and transceiver) and the mobile device 303 includes a similar wireless connection 309. The mobile device 303 may wirelessly communicate with the computer system through a network 310 using antennas 309, 308. Alternatively the mobile device and the computer system may be physically connected to the network or each other. The physical connection may be for example and without limitation an ethernet cable, RS232 cable, USB, etc. Additionally the game controller 305 may be communicatively coupled to the mobile device via for example and without limitation a physical connection (such as a USB cable, PS/2 cable etc.), or a wireless connections (such as a wireless PAN, Near field, Infra-red etc.). A clip 312 may couple the mobile device 303 to the game controller 305 to hold the mobile device in a usable position while the user holds the game controller.

In the implementation shown the computer system 301 may generate an assistance game including one or more assistance frames for the mobile device 303. The assistance frames may be taken from an application running on the computer system 301 and converted into an assistance game that is sent to the mobile device. The assistance game may be saved to the mobile device 303 or the computer system may run the assistance game and send one or more assistance frames from the assistance game to the mobile device. In some implementations the assistance game may be generated from challenging application states of the application. For example and without limitation, the computer system may detect one or more challenging application tasks or states and may record application states prior to the detected challenging application state. An assistance application may then be created using the application states recorded prior to the challenging application states. In this implementation, the application may be for example and without limitation a video game and the challenging application task or state may be a boss fight or an end state of the video game. An assistance game may be generated using the application states prior to the challenging application state and initialization information from the application allowing the user to play a small segment of the game. For example, the assistance game may be a boss fight from the application or a challenging segment of a level in the game.

Figure 4:
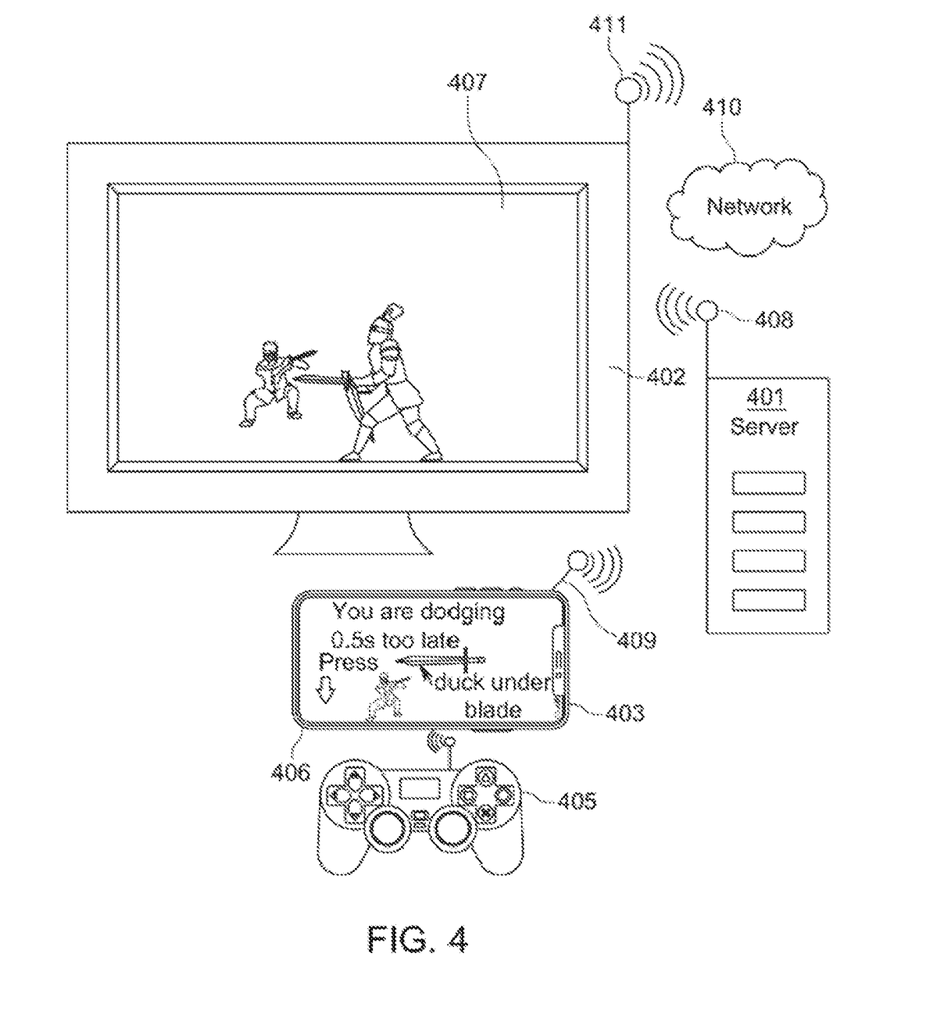
FIG. 4 is a diagram depicting an example of a mobile game trainer on a mobile device coupled to a game controller and a remote computer system according to aspects of the present disclosure.

FIG. 4 is a diagram depicting a mobile game trainer on a mobile device coupled to a game controller and a remote computer system according to aspects of the present disclosure. As shown the mobile device 403 is communicatively coupled to a remote computer system 401 that is associated with a display 402. Here the remote computer system may be for example and without limitation a server that is not in close proximity to the display or the mobile device. The server may communicate with the display 402 and the mobile device 403 over a network 410. Additionally, the game controller 405 may communicate with the server 401 over the network 410. To facilitate communication the display screen 402 may include wireless connection 411 including, e.g., an antenna and associated transceiver. Likewise, the mobile device 403 may include a similarly-configured wireless connection 409 as may the game controller 405. Each of the devices may be communicatively coupled with wired or wireless connections to each other directly or through a network such as the internet or a local area network.

In this implementation the mobile game trainer displays one or more assistance frames 406 in the mobile display that are a replay of challenging application states originally displayed 407 on the display screen 402. The replay of the challenging application states may also include text and/or graphics and/or audio presented over the scene. The text or graphics or audio may include tips or tricks for the user to improve their skill. The computer system may generate the frames of the replay from application states prior to the challenging application state and challenging application state. For example, the computer system may re-render frames from application states and send those frames to the mobile device and a slow motion replay may be created by interpolating additional frames or slowing down a frame rate. Text may be generated in the one or more assistance frames using developer flags or key words to insert phrases or words stored in memory into the frame. The location of the text may be placed in a default location like upper left, upper right, lower left or lower right of the frame. Alternatively, the text may be placed based on pixel value of the frame, for example the text may be placed in areas of the frame that contain large blocks of having pixel values corresponding to white or black pixels this ensures that the text is in an area of the screen where no important visual information is presented. In some implementations, the computer system 401 may generate audio instead of or in conjunction with text, e.g., using text to speech. The computer system can present the audio with speakers that are incorporated into, or otherwise associated with, the display 402.

Method of Operation

Figure 5:
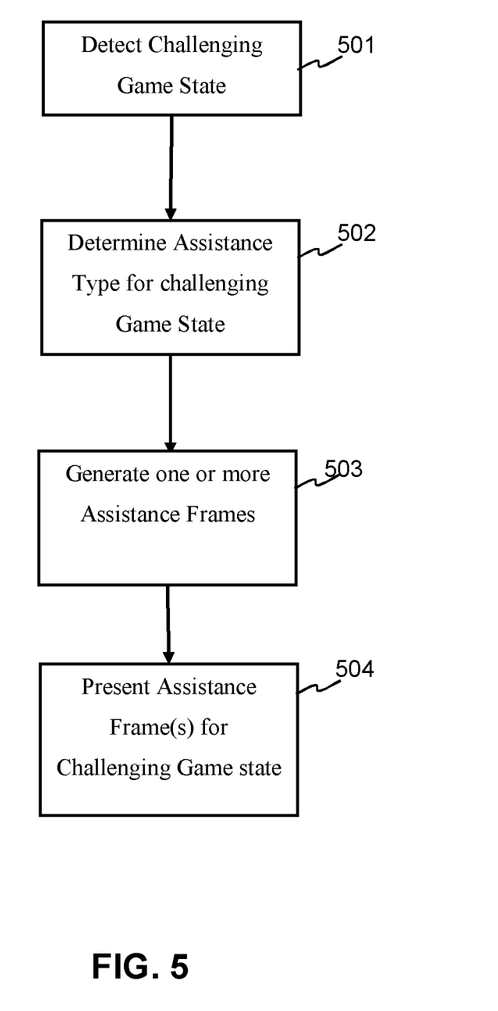
FIG. 5 is a flow diagram depicting an example of a method for implementing a mobile game trainer according to an aspect of the present disclosure.

FIG. 5 is a flow diagram depicting an example of a method for implementing a mobile game trainer according to an aspect of the present disclosure. As shown, the computer system may detect a challenging application state at 501. For example and without limitation, the computer system may detect that the application has reached a premature end state (e.g. a game over screen) or that the user has spent more time on a particular application task or in a particular application state or that a particular task or state is challenging based on user statistics. In some implementations, the application developers may flag certain portions of the application as being challenging, the computer system may use the flags to determine which application state or states are challenging. Next the computer system may determine the type (or types) of assistance frames to be generated for the challenging application state at 502. For example and without limitation, the assistance frame type may be determined by settings entered by a user or alternatively the application may determine the type of assistance frames to be generated based on the type of challenging application state. For example and without limitation if the challenging application state is an end state of the application, a replay may be chosen as the type of assistance frames to be displayed. Based on the type (or types) of assistance frames determined, the computer system may generate one or more assistance frames as indicated at 503. One or more assistance frames may be generated by, for example and without limitation, saving data corresponding to one or more frames from an application running on the computer system and modifying the data to include additional assistance information such as suggested key presses, or key press combination or button presses or button press combinations or other information provided by the application developer. The computer system may include a library of tips and tricks for the application that may be searched to provide key or button press combination as well as other helpful information to the user such as item location or game strategies. The other information provided by the developer may include for example and without limitation, flags for events within the application, timings for events within the application, or important locations on assets within the application. Alternatively, one or more assistance frames may be taken from pre-defined assistance frames that may be created by the application developers or generated by the computer system based on application parameters such as application controls. In some implementations, e.g., video game applications, game developers may provide data usage information that may be used to generate assistance information. By way of example, and not by way of limitation, games that rely on complex button combinations or sequences (e.g. fighting games like Mortal Kombat, Street Fighter, etc.), often include either a "tutorial mode" or move-set list as part of the game. Button mapping, timing and sequencing data may be pulled from these existing, in-game repositories. Finally, the one or more assistance frames may be sent to a mobile device where they are presented at 504. In some implementations the mobile device may modify the one or more assistance frame, for example the mobile device may change the resolution or sizing of the one or more assistance frames to fit on the mobile display.

Figure 6:
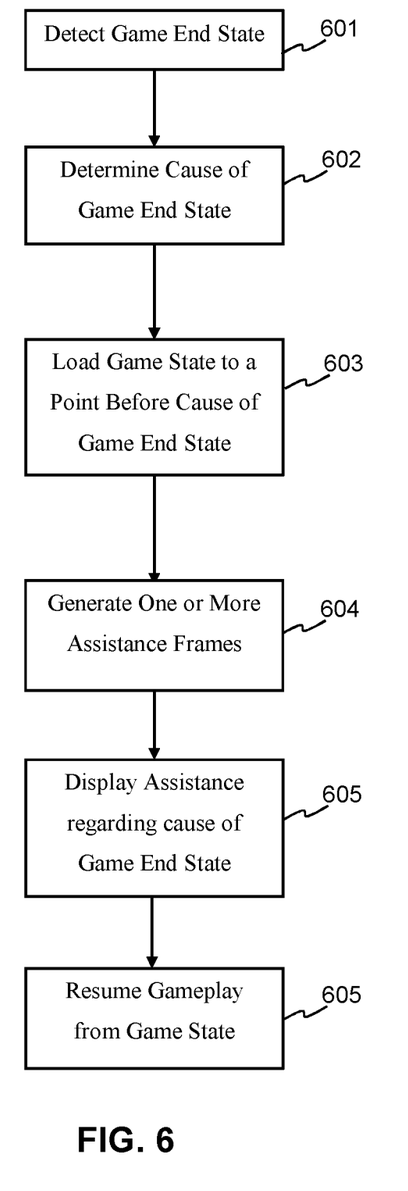
FIG. 6 is a flow diagram depicting an example of a method for implementing one or more synchronously displayed assistance frames with a mobile game trainer according to an aspect of the present disclosure.

FIG. 6 is a flow diagram depicting another example of a method for implementing one or more synchronously displayed assistance frames with mobile game trainer according to an aspect of the present disclosure. In this example, the application is a game. Here the game reaches a premature end state at 601, for example and without limitation, a game over screen or a level restart or level section restart start command. The computer system may then determine the cause of the end state at 602. By way of example and not by way of limitation, the computer system may use game data such as player health or player position, locations of non-player characters or other player-related or game state information to determine the cause of the end state. Additionally, in some implementations, the end state may be part of a sequence of two or more challenging application states and in which case, the computer system may determine a state before the challenging application state as the cause of the end state. For example and without limitation, the computer system may use tags placed by the developers to determine a challenging section, or time between a change in game data such as player health, player stamina, player location, etc. Once the cause of the game end state has been determined the game may be loaded at a point before the game end state at 603. Contemporaneously, before or after loading the game state one or more assistance frames may be generated at 604 based on the determined end state and other information regarding challenging application states. As discussed above one or more frames of the challenging application states may be taken from the game and altered to include assistance information or developer made frames with assistance information corresponding to the challenging application states may be used.

In some implementations a playable assistance game may be created from challenging application states prior to the end state. The game may include base game initialization data and the challenging application states may be used with the base initialization data to create a small application that allows the user to play a portion of the game on the mobile device. The game initialization data and challenging application states may be converted to a format that is useable by the mobile device. Additionally, assets required to run the challenging application states may be used and may be converted into a format usable by the mobile device. For example and without limitation, the polygon count of a model or size of a texture, or a vertex count or the like may be change to be compatible with the mobile device. The assistance application may run on the computer system and streamed over the network to the mobile or alternatively the assistance game may be loaded into the memory of the mobile device and run on the mobile device.

In alternative implementations, assistance information may be generated by assistance logic that determines which assistance information is most relevant based on basic data that the game system gathers during gameplay leading up to the end of a challenging state. For example, the user may reach the end of a challenging state when a player character dies while fighting a boss AI. The game system could record certain information relating to the state of the game at this point, e.g., which game, which level, which boss, which weapon, etc. The assistance logic could use this information to find or generate a tip for beating this boss. For example, there may be a whole library of tips generated by other players for one or more games including this particular game. The assistance logic could surface all tips to the user and let them choose. The logic may include some type of artificial intelligence that uses the end of state data to predict what assistance to show to the user.

Tips for assistance may be open source or created by other users and the assistance generation system may keep track of which tips have been up-voted by other users. So if users find tips helpful they can give them a thumbs-up, and then also determine which tips to surface based on the game data of the user who provided the tip. For example, many users may provide tips for beating the boss in the above example. However, if one of those users has a player character with a combination of setup, weapon and armor and that matches that of another player facing the same boss, then that tip could be more relevant to that player attempting to defeat the boss.

After generation of one or more assistance frames, the one or more assistance frames may be presented with the mobile device as indicated at 605. For example, the computer system may send the one or more assistance frames to the mobile device and the mobile device may be configured to present assistance frames sent from the computer system on a display. Such a display could include a screen configured to display text, graphics, images, video, and the like. The display may further include one or more audio speakers and suitable driving hardware and/or software. The assistance frames may be stored in the memory of the mobile device before they are displayed. Alternatively, the mobile device may generate one or more assistance frames from information stored in the memory of the mobile device and display one or more of the generated frames. For example, the mobile device may run an assistance game or generate image frames containing assistance information. Finally, the game may resume at 606. In some implementations the assistance information may be displayed concurrently with the resumption of the game allowing the user to receive assistance on the mobile device for the game while playing the game. In this way the user could get helpful tips while playing the game without taking up screen space.

Figure 7:
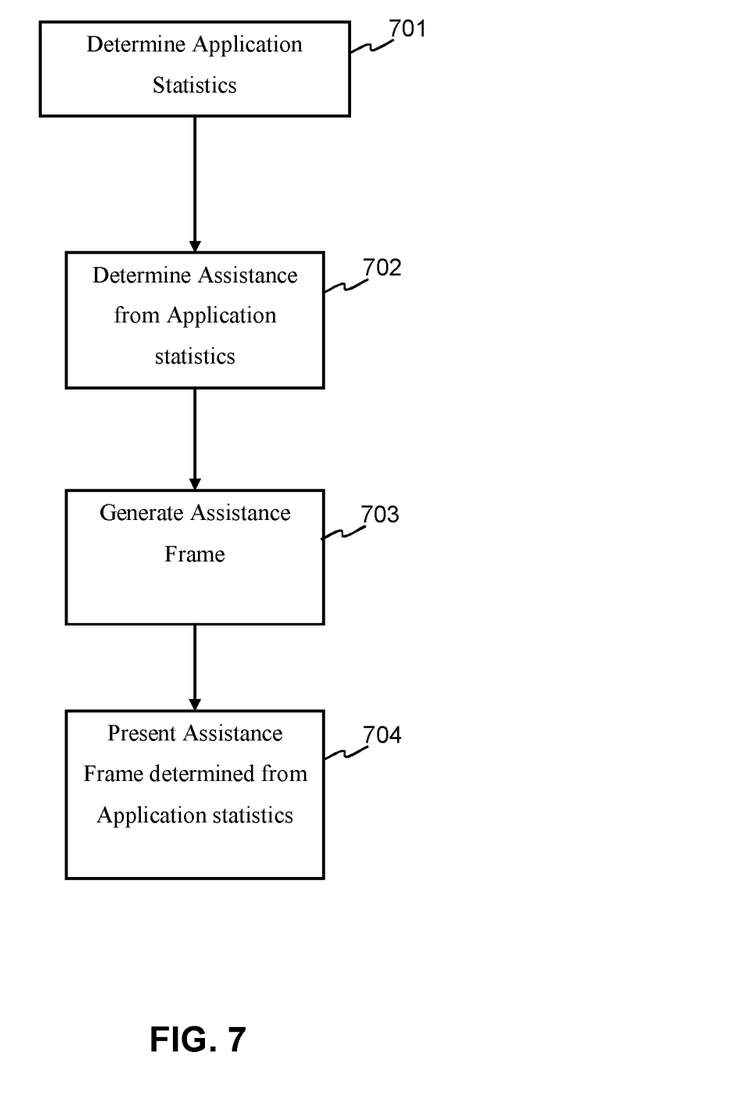
FIG. 7 is a flow diagram depicting an example of a method of generation of assistance with a mobile trainer based on user statistics according to aspects of the present disclosure.

The flow diagram shown in FIG. 7 depicts an example of a method of generation of assistance with a mobile trainer based on user statistics according to aspects of the present disclosure. In this implementation, user statistics may be determined from a history of execution of the application, as indicated at 701. The user statistics may be determined by, for example and without limitation, monitoring the computer system executing the application for user statistics while the application is running or by receiving user statistics from the application. The application may provide the computer system with additional information to aid in the determination of user statistics, for example and without limitation the application may provide the computer system with a log of key stroke or button press combinations, frame or scene timings, or game play choices. In some implementations the application may be a game and the application may provide the computer system with game related statistics such as button or key press combinations relevant to their game character, key or button combinations not used by the player, time spent in a particular area, average time spent in a particular area by most players, number of missed items, etc. From the determined application statistics the computer system may determine an assistance type for the application 702. By way of example and not by way of limitation if the user is not using or has relatively disused a particular key press or button combination the system may determine an assistance type that displays the key or button combination that has not been used or is relatively disused. In another example if application statistics show that the user is spending too much time at a particular portion of the application, the system may determine an assistance type such as a replay or tutorial video. Relatedly, if the user is missing a particular item or asset or portion of an asset in the application; a frame highlighting the particular item or asset or portion of asset may be determined as an assistance type. Once the type of assistance is determined, one or more assistance frames are generated by the computer system at 703 or information corresponding to the assistance fames is generated and sent to the mobile device where the one or more assistance frames are generated. As discussed above one or more frames may be taken from the application or generated from application statistics or other application information such as image frames. After the assistance frames have been generated, the assistance frames may be displayed on the mobile device at 704. The mobile device may generate the assistance frames from information stored in the mobile device memory or assistance frames may be sent to the mobile device stored or displayed.

Figure 8:
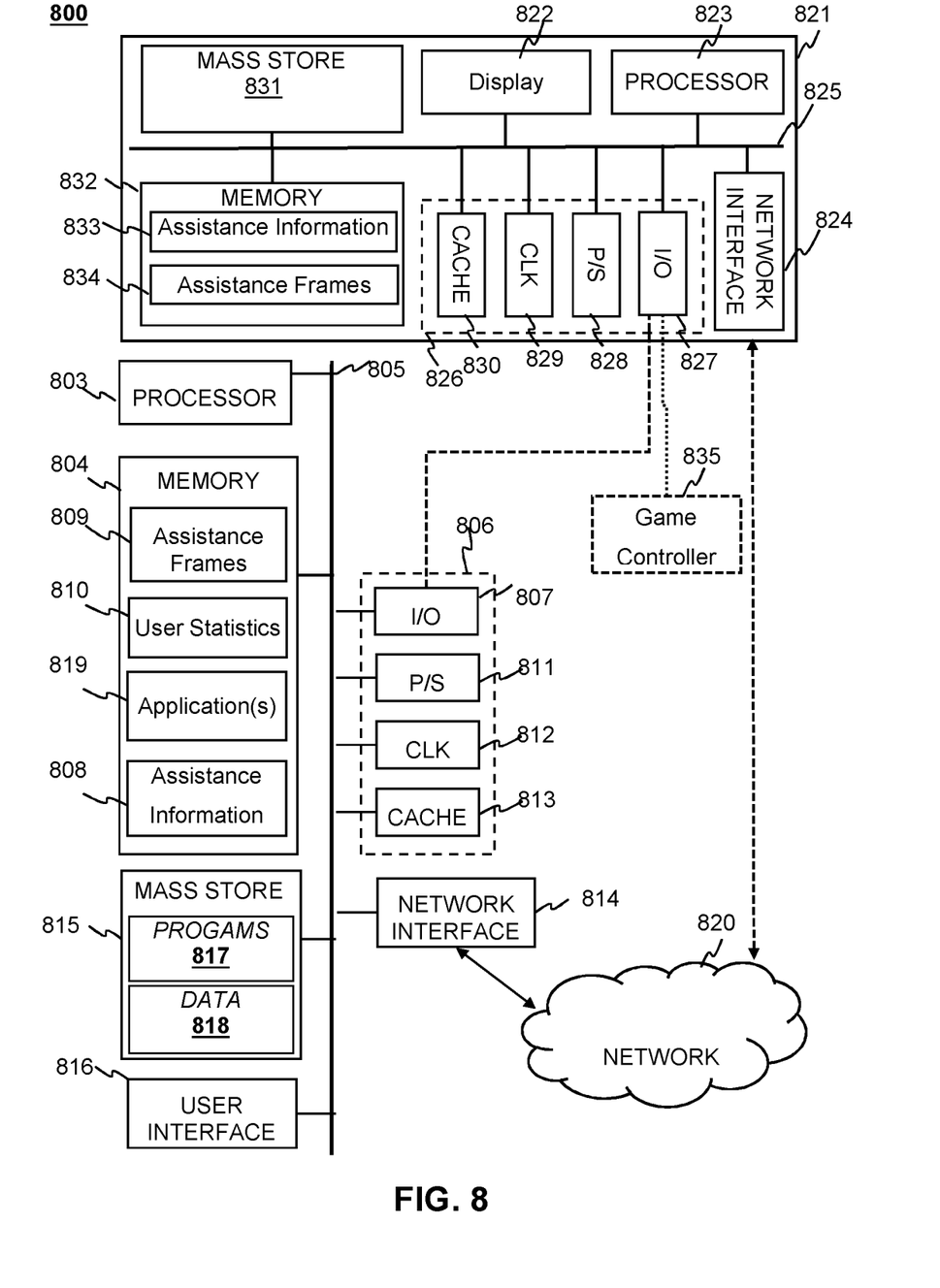
FIG. 8 is a block diagram depicting a system for implementing a mobile trainer according to an aspect of the present disclosure.

FIG. 8 diagrammatically depicts a system configured to implement a mobile trainer according to an aspect of the present disclosure. By way of example, and not by way of limitation, according to aspects of the present disclosure, the mobile trainer system 800 may include a combination of a computer system such as an embedded system, personal computer, workstation, game console, and a mobile device 821 such as a mobile phone, a portable game console, e-reader, tablet computer or the like.

The computer system generally includes a central processor unit (CPU) 803, and a memory 804. The computer system may also include well-known support functions 806, which may communicate with other components of the computer system, e.g., via a data bus 805. Such support functions may include, but are not limited to, input/output (I/O) elements 807, power supplies (P/S) 811, a clock (CLK) 812 and cache 813.

Additionally, the mobile device 821 generally includes a CPU 823, and a memory 832. The mobile device 821 may also include well-known support functions 826, which may communicate with other components of the mobile device, e.g., via a data bus 825. Such support functions may include, but are not limited to, I/O elements 827, P/S 828, a CLK 829 and cache 829. A game controller 835 may optionally be coupled to the mobile device 821 through the input/output 827. The game controller 835 may be used to interface with the mobile device 821. The mobile device 821 may also be communicative coupled with the computer system through the I/O of the mobile system 827 and the I/O of the computer system 807.

The computer system includes a mass storage device 815 such as a disk drive, CD-ROM drive, flash memory, solid state drive (SSD), tape drive, or the like to provide non-volatile storage for programs and/or data. The computer system may also optionally include a user interface unit 816 to facilitate interaction between the computer system and a user. The user interface 816 may include a keyboard, mouse, joystick, light pen, or other device that may be used in conjunction with a graphical user interface (GUI). The computer system may also include a network interface 814 to enable the device to communicate with other devices over a network 820. The network 820 may be, e.g., a local area network (LAN), a wide area network such as the internet, a personal area network, such as a Bluetooth network or other type of network. These components may be implemented in hardware, software, or firmware, or some combination of two or more of these.

Similarly, the mobile device 821 includes a mass storage device 831 such as a disk drive, CD-ROM drive, flash memory, SSD, tape drive, or the like to provide non-volatile storage for programs and/or data. The mobile device may also include a display 822 to facilitate interaction between the mobile device or mobile trainer system and a user. The display may include a screen configured to display, text, graphics, images, or video. In some implementations, the display 822 may be a touch sensitive display. The display 822 may also include one or more speakers configured to present sounds, e.g., speech, music, or sound effects. The mobile device 821 may also include a network interface 824 to enable the device to communicate with other devices over a network 820. The network 820 may be, e.g., wireless cellular network, a local area network (LAN), a wide area network such as the internet, a personal area network, such as a Bluetooth network or other type of network. These components may be implemented in hardware, software, or firmware, or some combination of two or more of these.

The CPU 803 of the computer system may include one or more processor cores, e.g., a single core, two cores, four cores, eight cores, or more. In some implementations, the CPU 803 may include a GPU core or multiple cores of the same Accelerated Processing Unit (APU). The memory 804 may be in the form of an integrated circuit that provides addressable memory, e.g., random access memory (RAM), dynamic random-access memory (DRAM), synchronous dynamic random-access memory (SDRAM), and the like. The main memory 804 may include application(s) 819 used by the processor 803 to generate for example, a drafting program, a spreadsheet, a video game, a word processor etc. The main memory 804 may also include user statistics 810 that may be generated during processing of the application 810. Assistance information 808 stored in the memory 804 may be used by the processor 803 to generate one or more assistance frame 809. The assistance information 808 may include instructions for the processor to carry out the methods described in FIGS. 6, 7 and 8. Additionally the assistance information 808 may include a library of tips and tricks for the user or frames of tutorial videos or guides.

The CPU 823 of the mobile device 821 may include one or more processor cores, e.g., a single core, two cores, four cores, eight cores, or more. In some implementations, the CPU 823 may include a GPU core or multiple cores of the same APU. The memory 832 may be in the form of an integrated circuit that provides addressable memory, e.g., RAM, DRAM, SDRAM, and the like. The main memory 832 may include assistance frames 834 received from the computer system or generated by the mobile device processor 823 from assistance information 833 also stored in the main memory 832. The assistance frames 834 may be presented with the mobile device display 822. A mass storage 831 of the mobile device 821 may store assistance information 833 and assistance frames 834 when not operated on by the processor 823.

The Mass Storage 815 of the computer system may contain Application or Programs 817 that are loaded to the main memory 804 when processing begins on the application 819. Additionally, the mass storage 815 may contain data 818 used by the processor to generate application assistance information 808 or assistance frames 809.

As used herein and as is generally understood by those skilled in the art, an application-specific integrated circuit (ASIC) is an integrated circuit customized for a particular use, rather than intended for general-purpose use.

As used herein and as is generally understood by those skilled in the art, a Field Programmable Gate Array (FPGA) is an integrated circuit designed to be configured by a customer or a designer after manufacturing—hence "field-programmable". The FPGA configuration is generally specified using a hardware description language (HDL), similar to that used for an ASIC.

As used herein and as is generally understood by those skilled in the art, a system on a chip or system on chip (SoC or SOC) is an integrated circuit (IC) that integrates all components of a computer or other electronic system into a single chip. It may contain digital, analog, mixed-signal, and often radio-frequency functions—all on a single chip substrate. A typical application is in the area of embedded systems.

A typical SoC includes the following hardware components:
- One or more processor cores (e.g., microcontroller, microprocessor, or digital signal processor (DSP) cores.
- Memory blocks, e.g., read only memory (ROM), random access memory (RAM), electrically erasable programmable read-only memory (EEPROM) and flash memory.
- Timing sources, such as oscillators or phase-locked loops.
- Peripherals, such as counter-timers, real-time timers, or power-on reset generators.
- External interfaces, e.g., industry standards such as universal serial bus (USB), FireWire, Ethernet, universal asynchronous receiver/transmitter (USART), serial peripheral interface (SPI) bus.
- Analog interfaces including analog to digital converters (ADCs) and digital to analog converters (DACs).
- Voltage regulators and power management circuits.

These components are connected by either a proprietary or industry-standard bus. Direct Memory Access (DMA) controllers route data directly between external interfaces and memory, bypassing the processor core and thereby increasing the data throughput of the SoC.

A typical SoC includes both the hardware components described above, and executable instructions (e.g., software or firmware) that controls the processor core(s), peripherals, and interfaces.

Aspects of the present disclosure provide for enhanced training in the use of computer applications by integrating aspects of a mobile device with a computer system. This leverages the computational and graphics resources of the mobile device for training without significantly taxing the resources of the computer system. Furthermore, the compactness and versatility of mobile devices makes them convenient for training and assistance.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for providing application assistance with a mobile device, comprising:
   a) running an application on a computer system;
   b) detecting a challenging application state of the application wherein detecting a challenging application state includes analyzing user statistics;
   c) determining an assistance for the challenging application state wherein the assistance includes display of one or more assistance frames on the mobile device and wherein determining the assistance includes determining unused key presses or unused key combinations or unused button presses or unused button press combinations from the user statistics;
   d) sending information regarding the determined one or more assistance frames to the mobile device, wherein the mobile device is configured to display the one or more assistance frames.

2. The method of claim 1 wherein detecting the challenging application state includes detecting that the application reached an end state.

3. The method of claim 2 wherein one or more application states prior to the end state are determined to be one or more challenging application states.

4. The method of claim 3 wherein d) further includes restarting the application at a state before the one or more challenging application states.

5. The method of claim 1 wherein sending information regarding the determined one or more assistance frames includes displaying a slowed down replay of image frames from the application.

6. The method of claim 1 wherein information regarding the determined one or more assistance frames includes displaying one or more image frames on the mobile device having user key or button presses shown.

7. The method of claim 1 wherein information regarding the determined one or more assistance frames includes displaying one or more image frame on the mobile device having secret or lesser used key presses or key press combinations or button presses or button press combinations, shown.

8. The method of claim 1 wherein information regarding the determined one or more assistance frames includes displaying one or more frames from the application that include an area of the frame highlighted or outlined.

9. The method of claim 8 wherein the application is a game and the area of the frame highlighted or outlined is an enemy weak spot or missed item or missed location.

10. The method of claim 1 wherein determining the assistance includes searching a library of tips or tricks for the application.

11. The method of claim 10 wherein displaying the determined one or more assistance frames includes displaying one or more images frames from a video sequence of tips or tricks.

12. The method of claim 1 wherein displaying the determined one or more assistance frames on the mobile device includes displaying frames from the application modified for use with the mobile device.

13. The method of claim 12 wherein the application is an interactive game and the frames from the application modified for use with the mobile device are part of an interactive application running on the mobile device.

14. A system for providing application assistance, comprising:
- a processor;
- a memory coupled to the processor;
- a mobile device coupled to the processor;
- non-transitory instructions stored in the memory that when executed by the processor cause the processor to carry out a method for providing application assistance comprising;
  - a) running an application with the processor;
  - b) detecting a challenging application state of the application wherein detecting a challenging application state includes analyzing user statistics;
  - c) determining an assistance for the challenging application state wherein the assistance includes display of one or more assistance frames on the mobile device and wherein determining the assistance includes determining unused key presses or unused key combinations or unused button presses or unused button press combinations from the user statistics;
  - d) sending information regarding the determined one or more assistance frames to the mobile device, wherein the mobile device is configured to display the one or more assistance frames.

15. The system of claim 14 wherein detecting the challenging application state includes detecting that the application reached an end state.

16. The system of claim 15 wherein one or more application states prior to the end state are determined to be challenging application states.

17. The system of claim 16 wherein d) further includes restarting the application to a state before the one or more challenging application states.

18. The system of claim 14 wherein information regarding the determined one or more assistance frames includes displaying a slowed down replay of image frames from the application.

19. The system of claim 14 wherein information regarding the determined one or more assistance frames includes displaying one or more image frames on the mobile device having user key or button presses shown.

20. The system of claim 14 wherein information regarding the determined one or more assistance frames includes displaying one or more image frame on the mobile device having secret or lesser used key presses or key press combinations or button presses or button press combinations, shown.

21. The system of claim 14 wherein information regarding the determined one or more assistance frames includes displaying one or more frames from the application that include an area of the frame highlighted or outlined.

22. The system of claim 21 wherein the application is a game and the area of the frame highlighted or outlined is an enemy weak spot or missed item or missed location.

23. The system of claim 14 wherein determining the assistance includes searching a library of tips or tricks for the application.

24. The system of claim 23 wherein displaying the determined one or more assistance frames includes displaying one or more images frames from a video sequence of tips or tricks.

25. The system of claim 14 wherein displaying the determined one or more assistance frames on the mobile device includes displaying frames from the application modified for use with the mobile device.

26. The system of claim 25 wherein the application is an interactive game and the frames from the application modified for use with the mobile devices are part of an interactive application running on the mobile device.

* * * * *